(12) United States Patent
Quintero et al.

(10) Patent No.: US 6,792,893 B1
(45) Date of Patent: Sep. 21, 2004

(54) RETRACTABLE TWO-PET LEASH

(76) Inventors: Diane Ellen Quintero, 11 Beech Slope Way, Durham, NC (US) 27713; Omar Alberto Quintero-Carmona, 11 Beech Slope Way, Durham, NC (US) 27713

(*) Notice: Subject to any disclaimer, the term of this patent is extended or adjusted under 35 U.S.C. 154(b) by 54 days.

(21) Appl. No.: 10/353,362

(22) Filed: Jan. 28, 2003

(51) Int. Cl.[7] ............................................... A01K 27/00
(52) U.S. Cl. ..................... 119/796; 119/794; 254/409
(58) Field of Search ............................... 119/796, 797, 119/798, 794, 787, 770, 795; 242/382; 254/399, 401, 409

(56) References Cited

U.S. PATENT DOCUMENTS

| | | |
|---|---|---|
| 557,832 A | 4/1896 | Knight |
| 610,088 A | 8/1898 | Scheerer |
| 673,907 A | 5/1901 | Johnson |
| 797,076 A | 8/1905 | Schultz |
| 870,784 A | 11/1907 | Huff |
| 887,689 A | 5/1908 | Olop |
| 934,114 A | 9/1909 | Weaver |
| 1,016,493 A | 2/1912 | Hackney |
| 1,069,593 A | 8/1913 | Weaver et al. |
| 1,090,015 A | 3/1914 | Birchbauer |
| 1,577,272 A | 3/1926 | Treadaway |
| 1,769,342 A | 7/1930 | Hall |
| 1,784,064 A | 12/1930 | Griswold |
| 1,904,000 A | 4/1933 | Hoyt |
| 1,956,938 A | 5/1934 | Wood et al. |
| 2,031,501 A | 2/1936 | Porter |
| 2,172,043 A | 9/1939 | Wolf |
| 2,217,323 A | 10/1940 | Sackett |
| 2,222,409 A | 11/1940 | Gottlieb |
| D124,073 S | 12/1940 | Gottlieb |
| D125,944 S | 3/1941 | Stickell |
| 2,249,114 A | 7/1941 | Coffman |
| 2,250,171 A | 7/1941 | Wilkins |
| D128,606 S | 8/1941 | Stickell |
| 2,257,099 A | 9/1941 | Beirise |
| 2,314,504 A | 3/1943 | Lifchultz |
| 2,400,589 A | 5/1946 | McArthur |
| 2,434,119 A | 1/1948 | Nordmark |
| D150,947 S | 9/1948 | Grandon et al. |
| 2,480,335 A | 8/1949 | Nordmark |
| 2,485,385 A | 10/1949 | Komassa |
| 2,619,559 A | 11/1952 | Schenkel |
| 2,647,703 A | 8/1953 | Hayes |
| 2,759,685 A | 8/1956 | Flippen |
| 2,776,644 A | 1/1957 | Fontaine |
| 2,793,617 A | 5/1957 | Palmer |
| 2,799,245 A | 7/1957 | Ruggiero et al. |
| 2,817,482 A | 12/1957 | Ruggiero et al. |

(List continued on next page.)

FOREIGN PATENT DOCUMENTS

| | | |
|---|---|---|
| EP | 0320079 | 6/1989 |
| EP | 0536859 | 4/1993 |
| GB | 788170 | 12/1957 |
| GB | 1020700 | 2/1966 |
| GB | 1546235 | 5/1979 |
| GB | 2290447 | 1/1996 |
| GB | 2315660 | 2/1998 |
| WO | WO 9200873 | 1/1992 |

*Primary Examiner*—Yvonne R. Abbott

(57) ABSTRACT

A retractable leash for two animals which includes two spool assemblies (24A and 24B) for individual extension and retraction of each animal's cord. Each animal's cord is controlled by a button and locking mechanism. The cord holes (20A and 20B) where the leash cords (12A and 12B) exit are opposite of each other to minimize or prevent entanglement. If the leash cords cross, the operator need only rotate the lease handgrip (38) to uncross the cords. In one locking design, braking and locking buttons (18A, 18B, 18C, 18D and 16A, 16B, 16C, 16D) are placed on both the top and bottom of the leash handgrip (38) so that the operator may turn the leash and be immediately ready to control the forward movement of the animals. The leash may also be adapted to mount on the animal's collars as separate units which fasten together to form one walking leash.

20 Claims, 7 Drawing Sheets

U.S. PATENT DOCUMENTS

| | | |
|---|---|---|
| 2,821,960 A | 2/1958 | Rudolph |
| 2,833,027 A | 5/1958 | Foster |
| 2,833,250 A | 5/1958 | Beebe |
| 2,889,807 A | 6/1959 | Beebe |
| 2,919,676 A | 1/1960 | Schneider |
| 2,976,959 A | 3/1961 | Husted |
| 2,992,487 A | 7/1961 | Miller |
| 3,021,091 A | 2/1962 | Swanson |
| 3,064,356 A | 11/1962 | Kruse |
| 3,088,438 A | 5/1963 | Oliphant |
| D198,757 S | 7/1964 | Rogers |
| D199,669 S | 12/1964 | Simon |
| 3,198,175 A | 8/1965 | Dean |
| 3,233,591 A | 2/1966 | Rogers et al. |
| 3,250,253 A | 5/1966 | Galin |
| 3,315,642 A | 4/1967 | Rogers et al. |
| 3,318,288 A | 5/1967 | Mullritter |
| 3,332,638 A | 7/1967 | Jessup et al. |
| 3,381,916 A | 5/1968 | Edgell |
| 3,477,410 A | 11/1969 | Lettieri |
| 3,480,227 A | 11/1969 | Matthews |
| 3,578,260 A | 5/1971 | Kell |
| 3,635,419 A | 1/1972 | Pringle |
| 3,664,599 A | 5/1972 | Partridge |
| 3,693,596 A | 9/1972 | Croce et al. |
| 3,705,697 A | 12/1972 | Chagnon |
| 3,776,198 A | 12/1973 | Gehrke |
| 3,812,588 A | 5/1974 | Bennett |
| 3,823,893 A | 7/1974 | Svensson |
| 3,853,283 A | 12/1974 | Croce et al. |
| D235,026 S | 4/1975 | Bogdahn |
| 3,889,897 A | 6/1975 | Van Zelderen |
| 3,937,418 A | 2/1976 | Critelli |
| 3,942,738 A | 3/1976 | Rutty |
| 3,964,441 A | 6/1976 | Wall |
| 4,018,189 A | 4/1977 | Umphries et al. |
| D244,869 S | 6/1977 | Manley et al. |
| 4,068,383 A | 1/1978 | Krebs |
| 4,114,736 A | 9/1978 | Scherenberg |
| 4,159,809 A | 7/1979 | Rawson |
| 4,165,713 A | 8/1979 | Brawner et al. |
| 4,194,703 A | 3/1980 | Roe |
| 4,197,817 A | 4/1980 | Crutchfield |
| 4,202,510 A | 5/1980 | Stanish |
| 4,215,829 A | 8/1980 | Boyllin |
| 4,269,150 A | 5/1981 | McCarthy |
| 4,328,766 A | 5/1982 | Deibert |
| 4,328,767 A | 5/1982 | Peterson |
| 4,427,163 A | 1/1984 | Kondziola |
| 4,446,884 A | 5/1984 | Rader, Jr. |
| D274,379 S | 6/1984 | Talo |
| 4,501,230 A | 2/1985 | Talo |
| 4,543,806 A | 10/1985 | Papandrea et al. |
| 4,562,792 A | 1/1986 | Pak et al. |
| 4,684,076 A | 8/1987 | Stamper |
| 4,733,832 A | 3/1988 | Napierski |
| 4,748,937 A | 6/1988 | Musetti |
| 4,765,557 A | 8/1988 | Kahmann |
| 4,773,623 A | 9/1988 | Nabinger |
| D298,579 S | 11/1988 | Brummett |
| 4,796,566 A | 1/1989 | Daniels |
| 4,809,925 A | 3/1989 | Takada |
| 4,856,726 A | 8/1989 | Kang |
| 4,879,972 A | 11/1989 | Crowe et al. |
| 4,887,551 A | 12/1989 | Musetti |
| 4,892,063 A | 1/1990 | Garrigan |
| 4,907,756 A | 3/1990 | Bourrat |
| 4,964,370 A | 10/1990 | Peterson |
| 4,977,860 A | 12/1990 | Harwell |
| 5,147,078 A | 9/1992 | Flieder |
| D337,396 S | 7/1993 | Werner |
| D337,866 S | 7/1993 | Wiens |
| 5,245,761 A | 9/1993 | Waldherr |
| 5,246,183 A | 9/1993 | Leyden |
| D341,682 S | 11/1993 | Musetti |
| D351,264 S | 10/1994 | Stout |
| 5,377,626 A | 1/1995 | Kilsby et al. |
| 5,388,877 A | 2/1995 | Wenk |
| 5,423,494 A | 6/1995 | Kondo |
| 5,483,926 A | 1/1996 | Bogdahn |
| 5,497,732 A | 3/1996 | Moffre et al. |
| 5,524,831 A | 6/1996 | Carlson |
| 5,540,468 A | 7/1996 | Fassman |
| 5,558,044 A | 9/1996 | Nasser, Jr. et al. |
| 5,595,143 A | 1/1997 | Alberti |
| 5,632,234 A | 5/1997 | Parker |
| D379,689 S | 6/1997 | Levine et al. |
| 5,701,848 A | 12/1997 | Tozawa |
| 5,701,981 A | 12/1997 | Marshall et al. |
| D392,429 S | 3/1998 | Plewa et al. |
| 5,724,921 A | 3/1998 | Bell |
| 5,762,029 A | 6/1998 | DuBois et al. |
| D402,426 S | 12/1998 | Levine et al. |
| 5,852,988 A | 12/1998 | Gish |
| 5,887,550 A | 3/1999 | Levine et al. |
| 5,890,456 A | 4/1999 | Tancrede |
| 5,901,668 A | 5/1999 | Goodger, Sr. |
| 5,964,385 A | 10/1999 | Simon |
| 5,983,836 A | 11/1999 | Chavez |
| 6,003,472 A | 12/1999 | Matt et al. |
| 6,024,054 A | 2/2000 | Matt et al. |
| 6,076,717 A | 6/2000 | Edwards et al. |
| 6,148,773 A | 11/2000 | Bogdahn |
| D439,302 S | 3/2001 | Plewa |
| 6,216,641 B1 | 4/2001 | Tracy et al. |
| 6,223,695 B1 | 5/2001 | Edwards et al. |
| 6,237,539 B1 | 5/2001 | Sporn |
| 6,240,881 B1 | 6/2001 | Edwards et al. |
| 6,247,428 B1 | 6/2001 | Mireles |
| 6,273,029 B1 | 8/2001 | Gish |
| 6,405,683 B1 | 6/2002 | Walter et al. |
| 6,474,270 B1 | 11/2002 | Imes |
| 6,481,382 B2 | 11/2002 | Cohn |
| 2003/0029388 A1 | 2/2003 | Walter et al. |

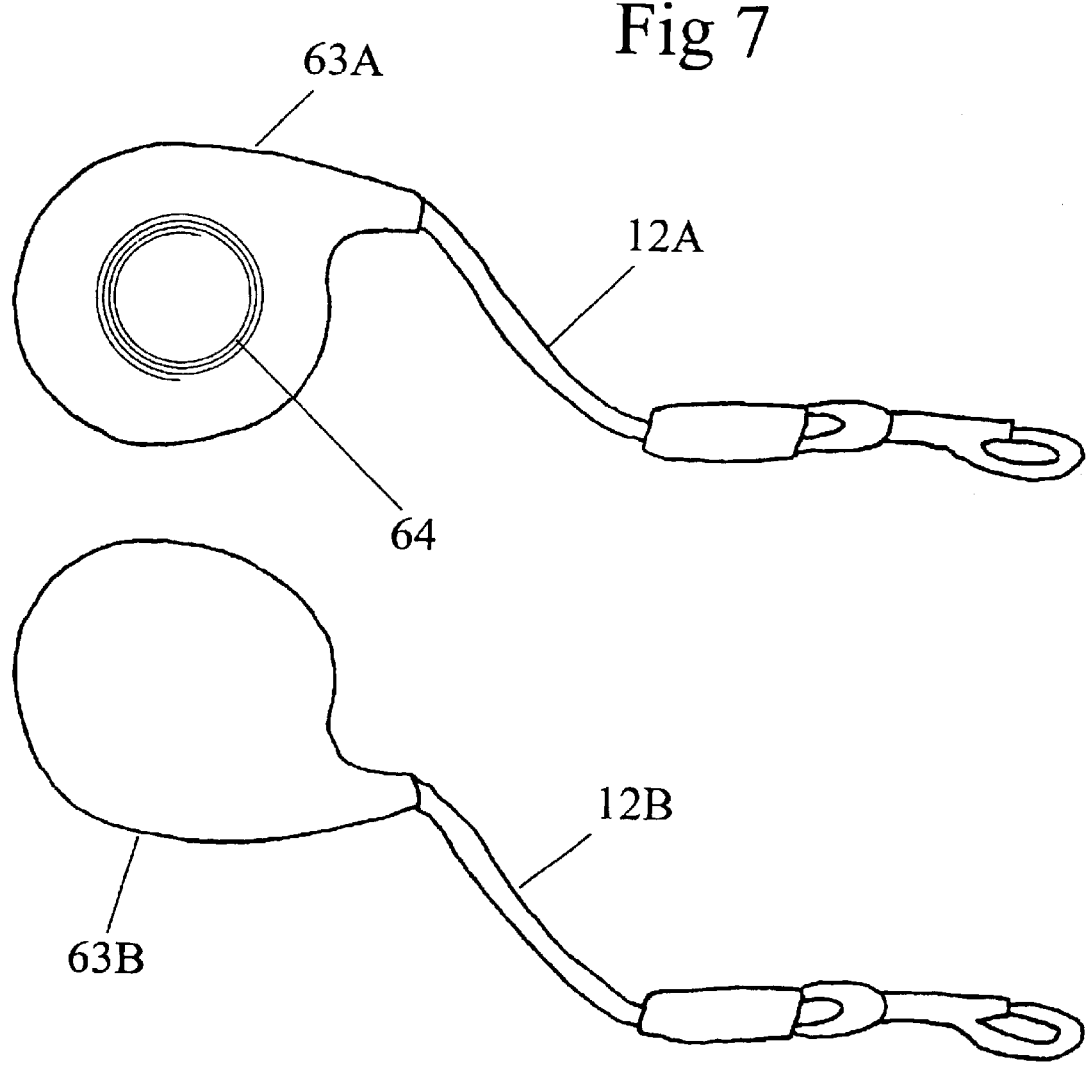

RETRACTABLE TWO-PET LEASH

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND

Field of the Invention

This invention relates to animal leashes, specifically to a retractable leash for walking two animals.

BACKGROUND OF THE INVENTION

Numerous types of retractable leashes are known in the art. Some of these include:

1. a flashlight is integrated with the leash,
    (U.S. Pat. No. 5,762,029 (1998) to DuBois et al., U.S. Pat. No. 5,887,550 (1999) to Levine et al., U.S. Pat. No. 5,983,836 (1999) to Chavez, U.S. Pat. No. 6,003,472 (1999) to Matt et al., U.S. Pat. No. 6,024,054 (2000) to Matt et al.)
2. a waste bag is integrated with the leash,
    (U.S. Pat. No. 5,890,456 (1999) to Tancrede)
3. the retractable portion of the leash is mounted on the animal's collar, and
    (U.S. Pat. No. 3,198,175 (1965) to Dean, U.S. Pat. No. 3,776,198 (1973) to Gehrke, U.S. Pat. No. 4,018,189 (1977) to Umphries et al., U.S. Pat. No. 4,165,713 (1979) to Umphries et al., U.S. Pat. No. 4,197,817 (1980) to Crutchfield, U.S. Pat. No. 4,328,766 (1982) to Deibert, U.S. Pat. No. 4,748,937 (1988) to Musetti, U.S. Pat. No. 4,887,551 (1989) to Musetti, U.S. Pat. No. 6,148,773 (2000) to Bogdahn, U.S. Pat. No. 6,405,683 (2002) to Walter et al.)
4. various types of braking mechanisms and inner workings are provided.
    (U.S. Pat. No. 2,217,323 (1940) to Sackett, U.S. Pat. No. 2,222,409 (1940) to Gottlieb, U.S. Pat. No. 2,250,171 (1941) to Wilkins, U.S. Pat. No. 2,314,504 (1943) to Lifchultz, U.S. Pat. No. 2,647,703 (1953) to Hayes, U.S. Pat. No. 2,776,644 (1957) to Fontaine, U.S. Pat. No. 2,919,676 (1960) to Schneider, U.S. Pat. No. 3,233,591 (1966) to Rogers et al., U.S. Pat. No. 3,315,642 (1967) to Rogers et al., U.S. Pat. No. 3,318,288 (1967) to Mullritter, U.S. Pat. No. 3,693,596 (1972) to Croce et al., U.S. Pat. No. 3,853,283 (1974) to Croce et al., U.S. Pat. No. 3,937,418 (1976) to Critelli, U.S. Pat. No. 4,202,510 (1980) to Stanish, U.S. Pat. No. 4,269,150 (1981) to McCarthy, U.S. Pat. No. 4,501,230 (1985) to Talo, U.S. Pat. No. 5,377,626 (1995) to Kilsby et al., U.S. Pat. No. 5,423,494 (1995) to Kondo, U.S. Pat. No. 5,483,926 (1996) to Bogdahn)

Although the aforementioned patents meet their particular objectives, they are all limited in that they only accommodate single animals. Many other known leashes are designed for two or more animals, but are not retractable. (U.S. Pat. No. 4,879,972 (1989) to Crowe et al., U.S. Pat. No. 4,892,063 (1990) to Garrigan, U.S. Pat. No. 5,632,234 (1997) to Parker, U.S. Pat. No. 5,724,921 (1998) to Bell, U.S. Pat. No. 5,852,988 (1998) to Gish, U.S. Pat. No. 5,901,668 (1999) to Goodger, Sr., U.S. Pat. No. 6,237,539 (2001) to Sporn, U.S. Pat. No. 6,247,428 (2001) to Mireles, U.S. Pat. No. 6,273,029 (2001) to Gish)

U.S. Pat. No. 6,474,270 (2002) to Imes, shows a retractable leash for multiple animals. Imes's leash consists of one standard retractable leash, with one or more pulleys attached to one or more nylon straps that run along the main retractable leash cord. One dog is attached to the main retractable leash cord and other dog(s) are attached to the nylon strap(s) that run along the main leash cord. Although Imes states that one or more animals of different size and strength may use the leash without causing pull on the other dogs, she admits that pull can still occur if the leash is fully retracted or locked by the operator. In these instances, the dogs that are attached to the pulleys may also be restricted in their lateral movement.

OBJECTS AND ADVANTAGES

Accordingly several objects and advantages of the present invention are:

a.) to provide an improved leash, b.) to provide a new retractable leash which can be used to walk two animals, and c.) to provide a new retractable leash which allows the animals to have freedom of movement in all directions and does not allow for pull between dogs even if locked or fully retracted.

Other objects and advantages are:

d.) to provide a new retractable leash which encounters minimal entanglement and allows the operator to easily manage the leash cords, e.) to provide a dual-animal leash which gives each animal its own spooling mechanism such that each animal may have control over the cord length to the extent that the operator allows, f.) to provide a dual-animal leash which allows the operator to brake one or both of the spooling mechanisms to prevent further extension or retraction of the leash cords, and g.) to provide a leash for two animals, which, in the event that the leash cords become crossed, the operator may easily uncross the leash cords by simply rotating the handgrip, and the leash will still be in immediate position for braking.

Additional objects and advantages will become evident from a consideration of the subsequent description and drawings.

SUMMARY OF THE INVENTION

The present invention provides a leash for two animals or pets, such as dogs, whereby the owner or operator can walk the dogs simultaneously. Each dog has its own retractable lead and to the degree that the operator allows, is in control of its own cord length. The operator does not have to fumble with multiple handgrips since this leash houses both retractable leads within one handgrip. Each lead has its own spooling mechanism and can be controlled individually by the operator.

DESCRIPTION OF DRAWINGS

FIG. 7 shows an alternate embodiment of the two-pet leash which can be mounted onto the animals' collars.

REFERENCE NUMERALS

Figure 1:
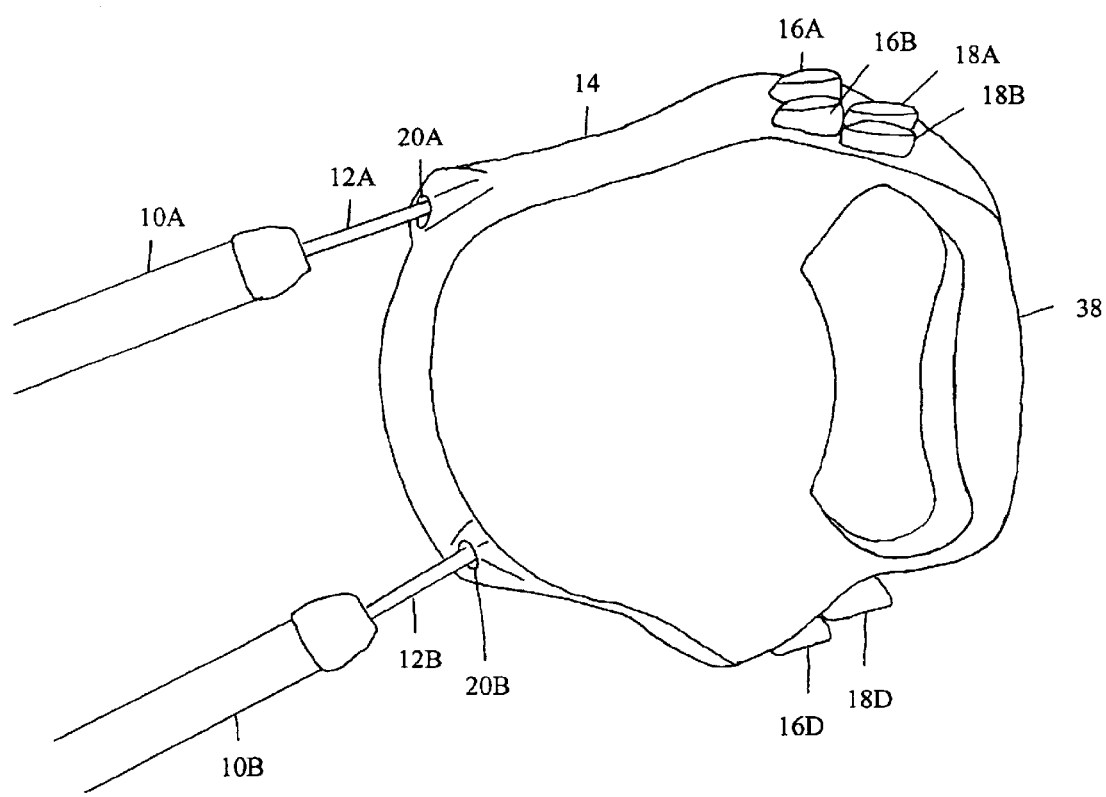
FIG. 1 shows an overall view of a retractable leash in accordance with the invention.

10A webbing for animal #1
10B webbing for animal #2
12 cord
12A cord for animal #1
12B cord for animal #2
14 housing
14A housing half for animal #1
14B housing half for animal #2
16A locking button for animal #1
16B locking button for animal #2
16C locking button for animal #1
16D locking button for animal #2
18A braking button for animal #1
18B braking button for animal #2
18C braking button for animal #1
18D braking button for animal #2
20 cord hole
20A cord hole for animal #1
20B cord hole for animal #2
22 rotatable wheel
22A rotatable wheel for animal #1
22B rotatable wheel for animal #2
24A spool assembly for animal #1
24B spool assembly for animal #2
26A teeth for animal #1
26B teeth for animal #2
28A spring for animal #1
28B spring for animal #2
30A reel cover for animal #1
30B reel cover for animal #2
32 housing partition
34 partition hole
36 axle
38 handgrip
38A handgrip half for animal #1
38B handgrip half for animal #2
40A radially outer end for animal #1
40B radially outer end for animal #2
42A radially inner end for animal #1
42B radially inner end for animal #2
44A rotatable wheel cavity for animal #1
44B rotatable wheel cavity for animal #2
46 slot
48A lever for animal #1
48C lever for animal #1
50A button lip for animal #1
50C button lip for animal #1
52A top of braking button for animal #1
52B top of braking button for animal #2
54 braking button
56 braking button hole
58 rod
60 protrusion
62 housing
63A housing for animal #1
63B housing for animal #2
64 screw attachment

DETAILED DESCRIPTION—FIGS. 1 TO 3

FIG. 1 is a perspective view of the outside of our retractable leash. The leash has a handgrip 38, braking buttons 18A, 18B, 18C (not shown in FIG. 1, but shown in FIG. 2), and 18D, locking buttons 16A, 16B, 16C (not shown in FIG. 1, but shown in FIG. 2), and 16D, a housing 14, cord holes 20A and 20B, leash cords 12A and 12B, and webbings 10A and 10B. Housing 14 contains a retracting mechanism inside and includes handgrip 38, which the operator of the leash grasps while walking the animals. Two leash cords 12A and 12B are integrated with the retracting mechanism within housing 14 and exit from housing 14 via cord holes 20A and 20B, respectively. Leash cords 12A and 12B end with strips of webbing 10A and 10B, respectively. This webbing then generally ends with a clip that attaches to the pet's collar.

Two braking buttons 18A and 18B are mounted atop housing 14, which, when depressed by the operator, act to stop the retraction of leash cords 12A and 12B, respectively. Two locking buttons 16A and 16B are also mounted on top of housing 14 and serve to lock the stopped position of braking buttons 18A and 18B, respectively, thereby allowing the operator to release braking buttons 18A and 18B while maintaining the immobilization of leash cords 12A and 12B. Similarly, another set of braking buttons 18C (not shown in FIG. 1, but shown in FIG. 2) and 18D are mounted on the bottom of housing 14, and act to halt the motion of leash cords 12A and 12B, respectively. Another pair of locking buttons 16C (not shown in FIG. 1, but shown in FIG. 2) and 16D are also mounted on the bottom of housing 14 and may be used to lock the stopped position of braking buttons 18C (not shown in FIG. 1, but shown in FIG. 2) and 18D, respectively.

Figure 2:
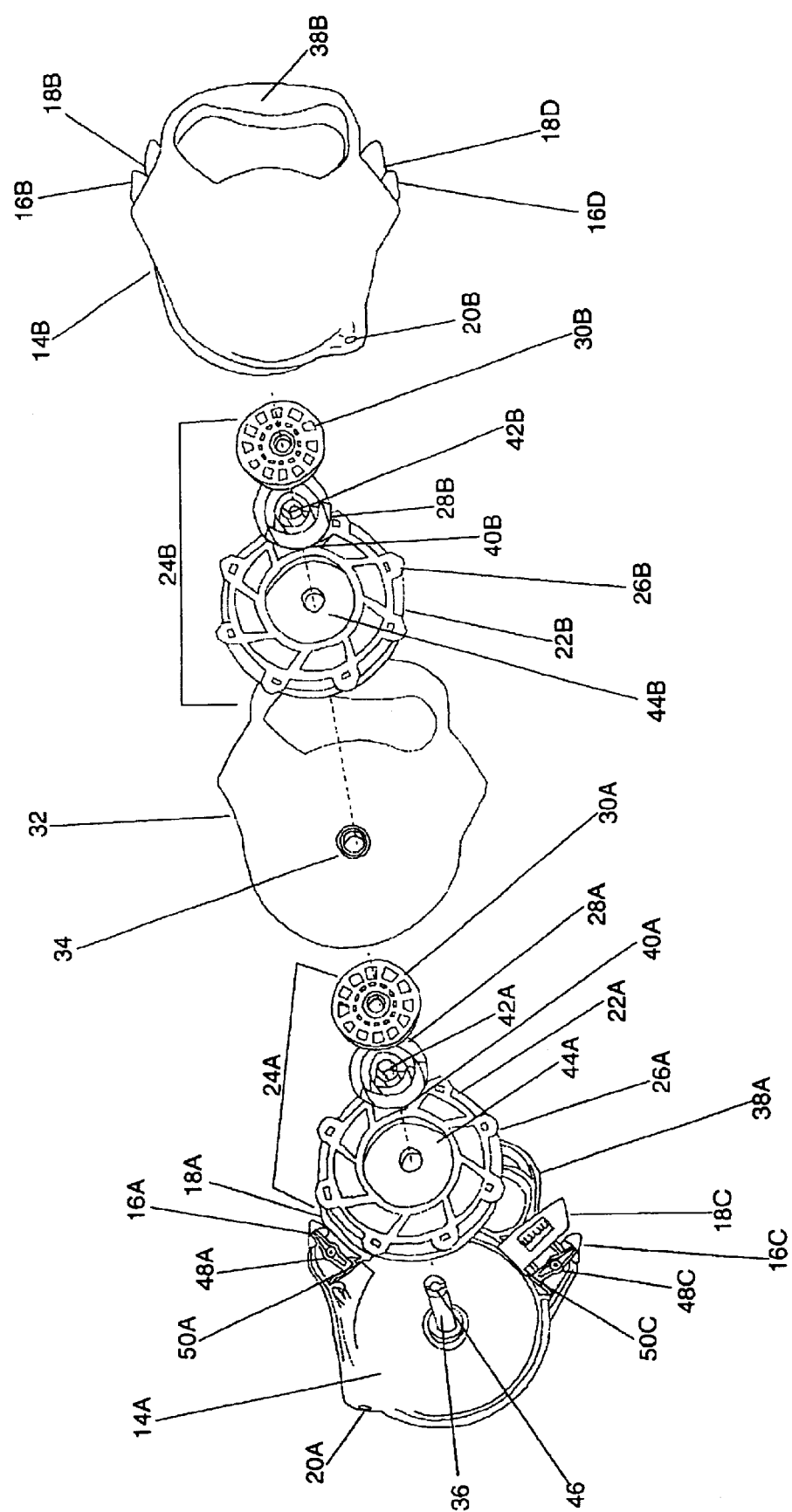
FIG. 2 shows the construction of the leash.

FIG. 2 is a perspective view of the leash. The housing is fabricated in two halves. One housing half 14A has a handgrip 38A and a cord hole 20A for leash cord 12A (not shown in FIG. 2, but shown in FIG. 1) to exit the leash assembly. A stationary axle 36 extends from housing half 14A. A spool assembly 24A includes a rotatable wheel 22A, a power spring 28A, and a reel cover 30A. A radially outer end 40A of power spring 28A fastens to the inner wall of a rotatable wheel cavity 44A. Rotatable wheel 22A and attached spring 28A fit onto stationary axle 36. When mounted on axle 36, a radially inner end 42A of spring 28A fits into a slot 46 of axle 36. In this way spring 28A is fastened at the radially outer end 40A to rotatable wheel 22A and at the radially inner end 42A to axle 36.

A reel cover 30A fastens over spring 28A to secure spring 28A in cavity 44A. Spring 28A is initially coiled to spring bias spool assembly 24A to retract leash cord 12A (not shown in FIG. 2, but shown in FIG. 1).

Additionally as rotatable reel 22A rotates to extend leash cord 12A (not shown in FIG. 2, but shown in FIG. 1) out of cord hole 20A, spring 28A coils further, thereby providing additional retracting bias as the extended portion of cord 12A (not shown in FIG. 2, but shown in FIG. 1) increases.

Braking buttons 18A and 18C are spring-loaded and when depressed, catch between teeth 26A, stopping the motion of rotatable wheel 22A. Locking buttons 16A and 16C can be pushed forward to cause levers 48A and 48C to pivot and catch on button lips 50A and 50C, thereby locking the stopped position of rotatable wheel 22A.

A flat housing partition 32 divides spool assemblies 24A and 24B. Housing partition 32 fits onto axle 36 by way of partition hole 34. Another spool assembly 24B (matching in construction to spool assembly 24A) fits onto axle 36. Housing half 14B then fits onto axle 36 to finish the leash assembly. Housing half 14B is a mirror image of housing half 14A, including braking buttons 18B and 18D and locking buttons 16B and 16D. The only item that is not a mirror image is cord hole 20B where leash cord 12B (not shown in FIG. 2, but shown in FIG. 1) exits. Cord hole 20B is the opposite of cord hole 20A on other housing half 14A to separate leash cords 12A and 12B (not shown in FIG. 2, but shown in FIG. 1) once they have exited the housing (shown in FIG. 2 in halves 14A and 14B).

FIG. 3A is a top view of the leash showing the position of locking buttons 16A and 16B and braking buttons 18A and 18B. FIG. 3B is an enlarged view of braking buttons 18A and 18B depicted in FIG. 3A. The tops 52A and 52B, of braking buttons 18A and 18B, extend out toward one another, creating overhangs between braking buttons 18A and 18B.

OPERATION—FIGS. 1 TO 3

When walking two pets, the operator of the leash holds handgrip 38 and attaches each pet to a respective one of leash cords 12A and 12B. The attachment hardware is not shown in the drawings, but is known and typically is a clip at the end of webbings 10A and 10B which clips onto the pet's collar. Leash cords 12A and 12B will extend freely from cord holes 20A and 20B which are not located directly beside each other. Leash cords 12A and 12B may cross each other, but are not likely to tangle. If leash cords 12A and 12B cross, the operator simply has to rotate handgrip 38 and upon doing so, cords 12A and 12B will uncross.

The braking and locking system of the illustrated embodiment is described in terms of the first half of the leash assembly depicted in FIG. 2. Braking buttons 18A and 18C may be pressed by the operator to stop the motion of rotatable wheel 22A. Buttons 18A and 18C catch between teeth 26A located on rotatable wheel 22A to stop the motion of this wheel. As long as the operator continues to press either braking button, rotatable wheel 22A remains motionless and no further leash cord pays out. Locking buttons 16A and 16C can be pushed forward to cause levers 48A and 48C to pivot and catch on button lips 50A and 50C, thereby allowing the operator to release either braking button 18A or 18C while maintaining the stopped position of rotatable wheel 22A.

As shown in FIG. 3B, tops 52A and 52B, of braking buttons 18A and 18B, extend out toward one another, creating overhangs between the braking buttons. This makes it possible for the operator to compress the braking buttons simultaneously if desired. The operator may compress button 18A or 188B individually or together, depending upon the position of the operator's finger on the buttons. Therefore the operator may stop the release of leash cord for either or both dogs. Similarly, since locking buttons 16A and 16B are independent of each other, each dog may be in locked mode individually, or if both locking buttons 16A and 16B are activated, both dogs may be in locked mode together.

Preferably the colors of buttons 16A, 16C, 18A, and 18C match that of their respective leash cord and/or webbing. In a different color, but also matching, are buttons 16B, 16D, 18B, and 18D, leash cord 12B, and/or webbing 10B. For example, the buttons, cord, and webbing for dog #1 may be red and the buttons, cord, and webbing for dog #2 may be yellow. This makes it easier for the operator to identify which buttons control which leads. Alternatively housing half 14A can match leash cord 12A and/or webbing 10A. Similarly housing half 14B can match leash cord 12B and/or webbing 10B to obtain a similar desired result.

Although the illustrated embodiment describes using leash cords, we prefer that webbing be used in its place, as is seen in some current leash designs. If a dog crosses behind the operator, it is easier for the operator to grasp webbing and guide the dog back to the front than it is to grasp cord.

DESCRIPTION—ALTERNATIVE BRAKING DESIGN

Figure 3:
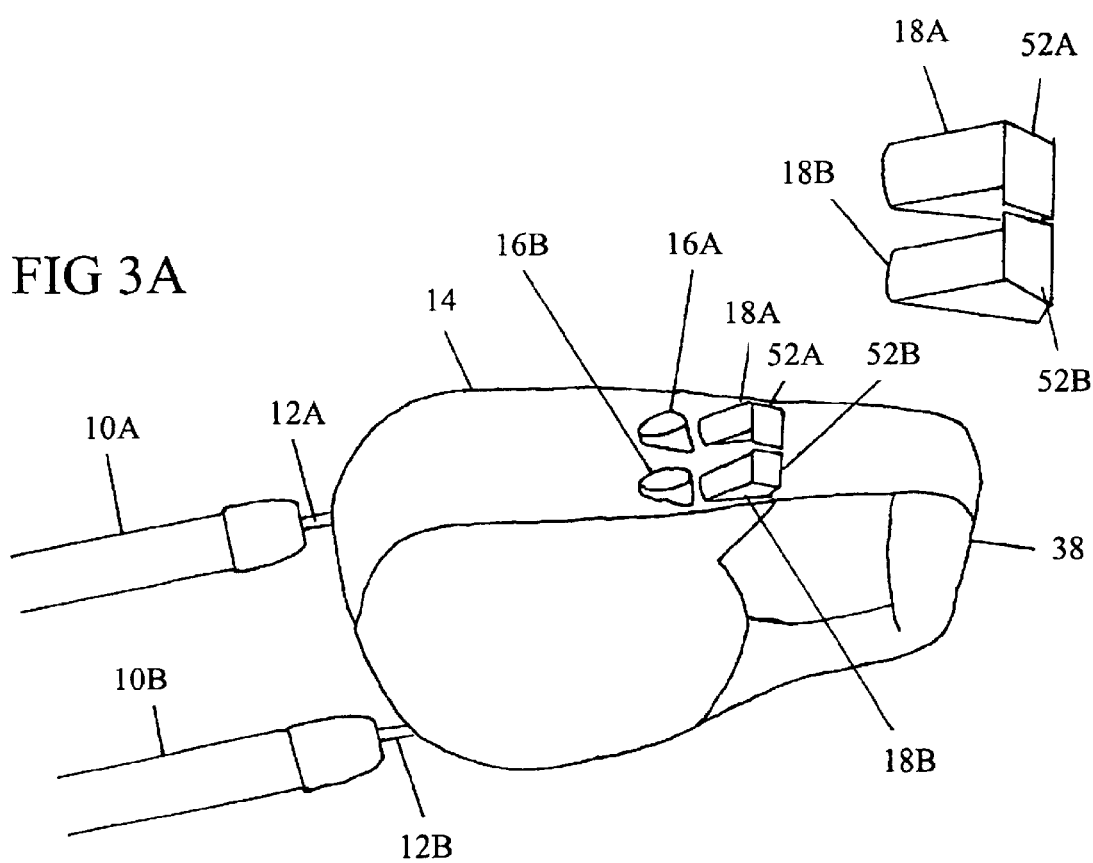
FIG. 3A is a view of the top of a housing for the leash, displaying the position of braking and locking buttons used with the leash.
FIG. 3B is an enlarged view of the braking buttons depicted in FIG. 3A.
Figure 4:
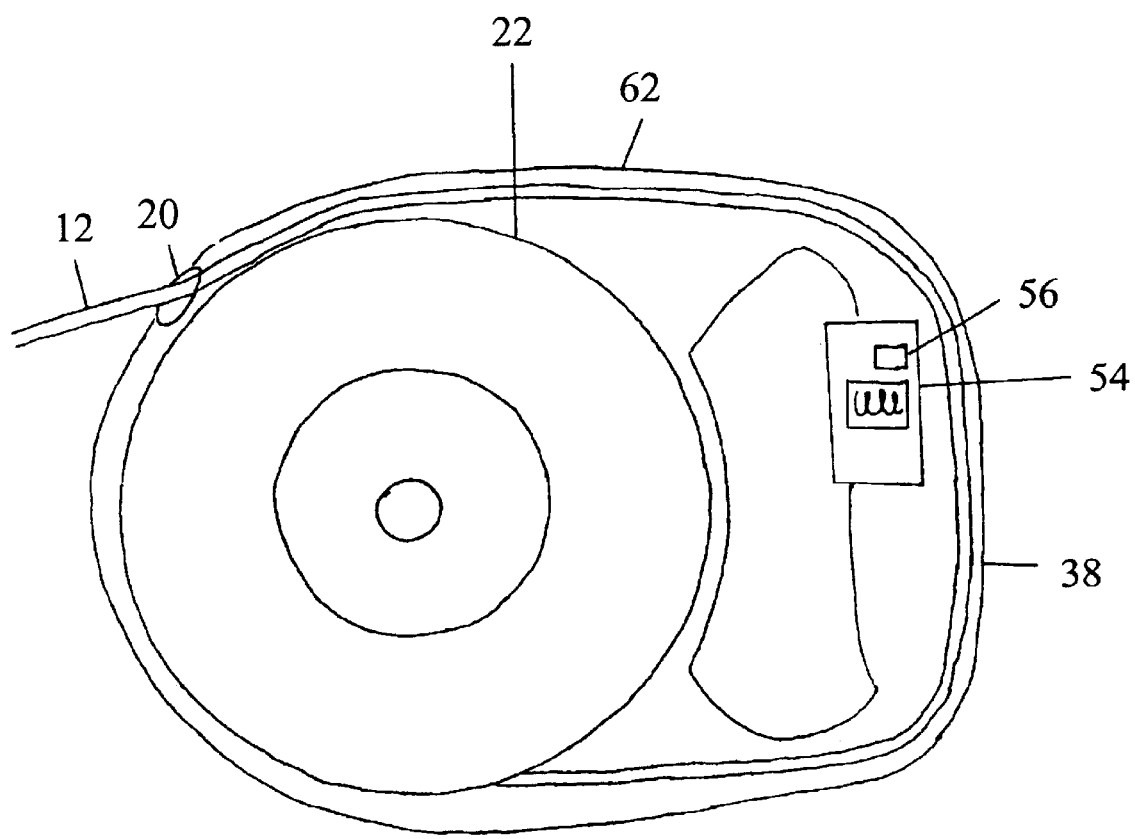
FIG. 4 is a side cross-sectional view of one half of the leash, depicting another braking design.
Figure 5A:
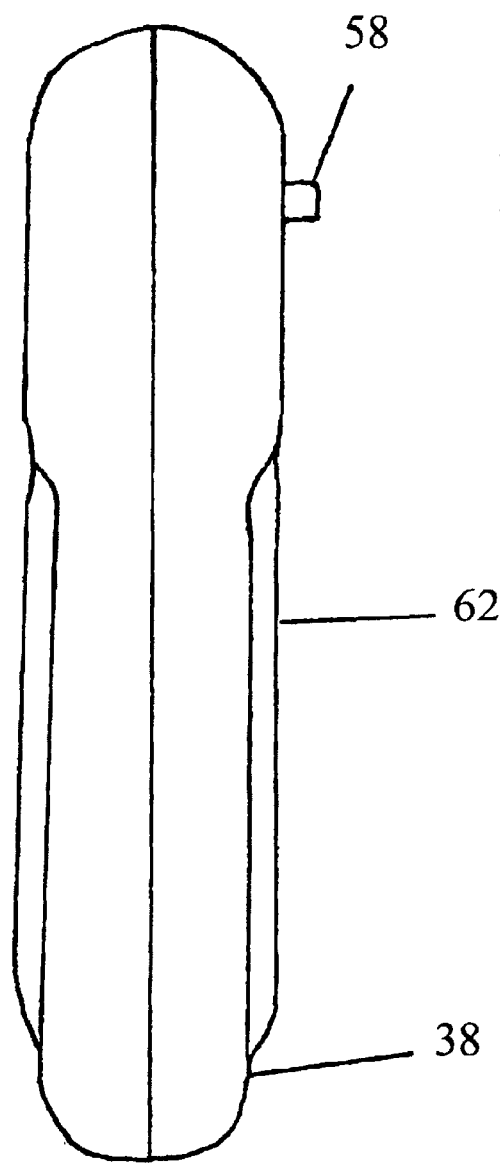
FIG. 5A is a view of the back of a handgrip which is part of the leash.
Figure 5B:
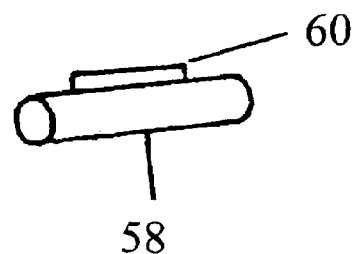
FIG. 5B shows a full view of a rod depicted in FIG. 5A.

In addition to the braking system shown in FIGS. 1 to 3, we propose an alternative braking system shown in FIG. 4. FIG. 4 shows only one half or side of the leash since the other side is identical (with the exception of the position of the leash cord holes which are opposite each other). In this design, leash cord 12 runs from rotatable wheel 22 through handgrip 38 and across the inside top of housing 62 and out cord hole 20. Braking button 54 is spring-loaded and when compressed, presses leash cord 12 against the inside wall of handgrip 38. A braking button hole 56 is provided in braking button 54. FIG. 5A is a view of the back of handgrip 38 and further depicts this second described braking method. A rod 58 protrudes from the side of handgrip 38 and is located between braking button 54 in un-braked mode and the back inside wall of handgrip 38. FIG. 5B shows the shape of rod 58. A protrusion 60 stems from rod 58.

The parts for this leash and braking design are virtually identical to the leash of FIGS. 1 to 3. The inside of the housing difers somewhat in order to guide leash cord 12 through handgrip 38 and across the inside top of housing 62. Braking button 54 can be shaped in any imaginable and suitable fashion, but is depicted as a simple rectangular cube in FIG. 4. Rod 58 is a new part to this design.

In still more alternative embodiments, any suitable type of brake devices can be used. In addition, any suitable type of retractable leash section can be provided. The housing can also have any suitable shape.

OPERATION—ALTERNATIVE BRAKING DESIGN

In the braking design of FIG. 4, braking button 54 is spring-loaded and when compressed presses leash cord 12 against the inside wall of handgrip 38. This creates friction and causes cord 12 to stop paying out through cord hole 20. Braking button 54 of each leash half can be pressed individually or they can be pressed simultaneously to stop one or both dogs from gaining additional leash cord. Rod 58 can be shifted from one side of handgrip 38 to the other through round holes on each side of the handgrip. When both braking buttons 54 are compressed, rod 58 may be shifted and rod 58 enters braking button holes 56 and through to the opposite side of handgrip 38. Thereby rod 58 keeps braking buttons 54 compressed and the operator may release his or her hand from braking buttons 54. Protrusion 60 that stems from rod 58, keeps rod 58 from coming fully out of handgrip 38 when it is shifted. Rod 58 shifts through housing 38 via round holes in the sides of handgrip 38. Protrusion 60 will not fit through the round holes and will hit the inner wall of handgrip 38 when rod 58 is shifted, thereby not allowing rod 58 to pass completely through handgrip 38. When in locked mode, this braking design requires that both dogs be locked together.

DETAILED DESCRIPTION—FIGS. 6 AND 7

Figure 6:
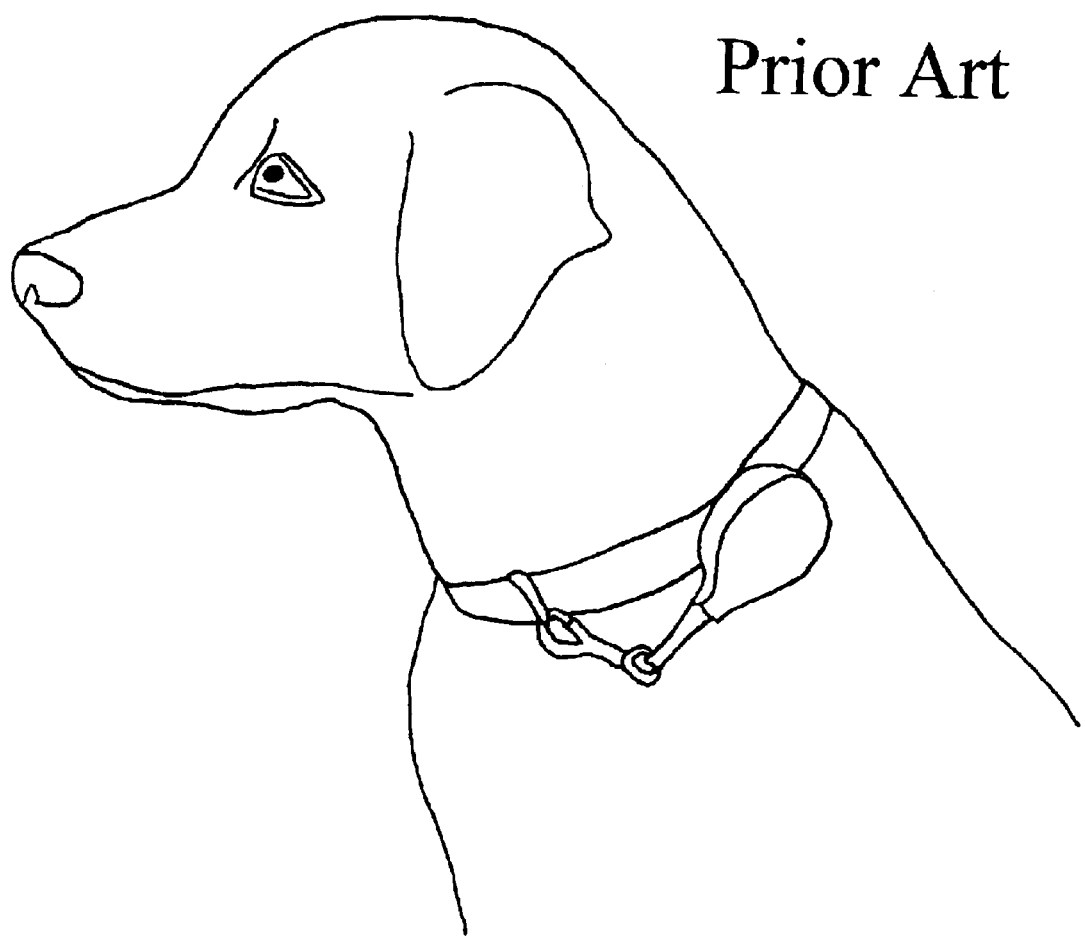
FIG. 6 illustrates a prior art retractable leash that mounts onto the dog's collar.

FIG. 6 illustrates a prior-art retractable leash that attaches to the animal's collar. This enables the animal to wear its leash at all times.

FIG. 7 is an alternative embodiment of a two-pet leash and is an inventive improvement to the prior-art leash of FIG. 6. In this embodiment, the housing portions for each animal are separate units and fasten together to form one unit for the operator to hold. These separate housing units can mount on the animals' collars. A housing 63A mounts onto one animal's collar. a housing 63B mounts onto a second animal's collar. Housing 63A is not identical to housing 63B. A leash cord 12A exits housing 63A near the top of housing 63A. In contrast, a leash cord 12B exits housing 63B near the bottom of housing 63B. This allows the leash cords to remain separate and not tangle easily. Housing 63B attaches to housing 63A by way of a screw attachment 64. Screw attachment 64 connects to a corresponding screw attachment on housing 63B (not shown). Screw attachment 64 and the corresponding screw attachment on housing 63B are on opposite sides of the housing such that they can be secured to one another.

In still more alternative embodiments, any suitable type of securing method can be used. Also, a handgrip can be incorporated.

OPERATION—FIG. 7

To use this embodiment, the operator grasps housing 63A from the collar of one animal, causing the leash to pay out cord as the operator walks away from the animal. The operator then grasps housing 63B for the second animal and screws housing 63B to 63A to effectively form one single leash unit. The leash may then be operated in a manner similar to that of FIG. 1. Since leash cords 12A and 12B are not located directly beside one another, leash cords 12A and 12B may cross each other, but are not likely to tangle. If leash cords 12A and 12B cross, the operator simply has to rotate the combined handgrip and upon doing so, cords 12A and 12B will uncross. Similarly braking and locking buttons could be added to achieve a result similar to that described in FIG. 2 or 4.

CONCLUSIONS, RAMIFICATIONS, AND SCOPE

Thus the reader will see that the retractable leash of this invention provides a new approach to walking two pets. The pets are allowed as much cord length as provided by the operator and the cord length is independent of the other pet's cord length. There is minimal entanglement due to the position of the holes where the leash cords exit. To undo entanglement, the operator only has to rotate the leash handgrip. As illustrated in the locking mechanism of FIG. 2, breaking buttons are provided on both top and bottom of the housing so when the handgrip is rotated, it is immediately in prepared mode to use the buttons to stop the motion of the rotatable wheel. As illustrated in FIG. 4, the leash is also immediately prepared for stopping the motion of the rotatable wheel, but does not require buttons on both sides.

The foregoing description is only illustrative of several embodiments of the invention. Various alternatives and modifications can be devised by those skilled in the art without departing from the spirit of the invention. E.g., any suitable size, shape, color, or type of elements or materials can be used. A loop of webbing, leather, or another suitable material can be used in place of a handgrip. A swivel can be placed between the housing and the handgrip and/or loop which would cause the handgrip and/or loop to turn automatically, rather than manually by the operator. Although discussed for use with dogs, the present leash may be used with other animals such as cats, pigs, ferrets, or any animal that can conceivably be attached to a leash.

Accordingly, the present invention is intended to embrace all such alternatives, modifications and variances which fall within the scope of the appended claims and their legal equivalents.

What is claimed is:

1. A device for walking two animals simultaneously, comprising:
   a. a housing having a means for enabling an operator to grasp said housing,
   b. two separate spool assemblies rotatably mounted inside said housing,
   c. two separate leashes mounted on said respective spool assemblies,
   d. said respective spool assemblies being arranged to selectively wind said respective leashes,
   e. said housing having two apertures, said leashes extending out of said housing through said respective apertures, said apertures being located so that said leashes extend out of said housing in the sane general directions so that said leashes may be used to control two animals by a single person holding said housing,
   f. each of said leashes having an end outside said housing with a clip or snap thereat for attaching said leash to a respective animal, and
   g. a plurality of buttons on said housing, each of said buttons arranged to inhibit rotation of a respective spool assembly in response to depression of said button and allow rotation of said spool assembly when said button is not depressed,
      whereby each animal may be kept at its own distance from said person independent of the other animal and said person can maintain control of said animals without fumbling with two individual devices.

2. The device of claim 1 wherein said buttons are located on opposite sides of said housing, whereby said operator may turn said housing one-half turn and be able to depress a button in a top position of said housing.

3. The device of claim 1 wherein said buttons on each housing side are close enough to each other so that said operator can depress said buttons simultaneously, whereby said operator may simultaneously stop the spooling of both said leashes and in turn control the movement of both said animals.

4. The device of claim 3 wherein the tops of said buttons overhang and extend toward one another so that said buttons may be pressed simultaneously and more easily.

5. The device of claim 1 wherein said buttons controlling each animal are different in color to make it easier for said operator to distinguish between them.

6. The device of claim 5 wherein the leash for each animal matches that animal's button to make it easier to distinguish the button which controls a respective animal.

7. The device of claim 1 wherein said housing has two halves for said respective animals, each half being different in color to enable said operator to distinguish which housing half and the parts inside control which animal.

8. The device of claim 7 wherein each housing half matches the color of its animal's leash to make it easier to distinguish the half controlling each animal.

9. The device of claim 1 wherein said housing is split into two halves as two separate units and the two individual units are removably secured to one another to effectively form a single unit.

10. An apparatus for walking two animals concurrently, including:
   a. means for permitting an operator to hold said apparatus,
   b. a housing or casing containing two separate rotatable wheels which operate as part of two spool assemblies,
   c. a pair of braking buttons which operate to halt the motion of said respective rotatable wheels,
   d. two leash cords or belts which extend or retract from said housing depending upon distance of animal to operator and operator's use of said braking buttons,
   e. means for attaching said cords to a pair of respective animals, and
   f. two holes in said housing through which said cords exit said housing in the same general direction.

11. The device of claim 10 wherein said buttons are located on opposite sides of said housing, whereby said operator may turn said housing one-half turn and be able to depress a button in a top position of said housing.

12. The device of claim 10 wherein said buttons on each housing side are close enough to each other so that said operator can depress said buttons simultaneously, whereby said operator may simultaneously stop the spooling of both said cords and in turn control the movement of both said animals.

13. The device of claim 12 wherein the tops of said buttons overhang and extend toward one another so that said buttons may be pressed simultaneously and more easily.

14. The device of claim 10 wherein said buttons controlling each animal are different in color to make it easier for said operator to distinguish between them.

15. The device of claim 14 wherein the cord for each animal matches that animal's button to make it easier to distinguish the button which controls a respective animal.

16. The device of claim 10 wherein said housing has two halves for said respective animals, each half being different in color to enable said operator to distinguish which housing half and the parts inside control which animal.

17. The device of claim 16 wherein each housing half matches the color of its animal's leash cord to make it easier to distinguish the half controlling each animal.

18. The device of claim 10 wherein said housing is split into two halves as two separate units and the two individual units are removably secured to one another to effectively form a single unit.

19. A method for walking two animals, comprising:
   a. providing a retractable device with two spool assemblies, including two respective rotatable wheels, said two spool assemblies being arranged to release respective leashes from said rotatable wheels and to turn to take up said leashes on said rotatable wheels,
   b. providing a braking means for stopping the motion of said rotatable wheels so as to allow an operator to control the movement of said animals,
   c. providing a handgrip or loop for said operator to grasp,
   d. providing means for keeping each spool assembly separate and contained,
   e. providing means for keeping said leashes separate,
   f. attaching said leashes to a respective pair of animals,
   g. holding said handgrip or said loop, and
   h. pressing said braking means to stop the motion of said rotatable wheels so as to stop the release of said leashes.

20. The method of claim 19 wherein said spool assemblies and said leashes are housed separately as two individual units and said two individual units are secured to one another to effectively form a single unit.

* * * * *

UNITED STATES PATENT AND TRADEMARK OFFICE
CERTIFICATE OF CORRECTION

PATENT NO. : 6,792,893 B1  
DATED : September 21, 2004  
INVENTOR(S) : Diane Quintero and Omar Quintero-Carmona Page 1 of 1

It is certified that error appears in the above-identified patent and that said Letters Patent is hereby corrected as shown below:

Column 5,
Line 59, change "188B" to -- 18B --.

Column 8,
Line 29, change "sane" to -- same --.

Signed and Sealed this

Fifteenth Day of February, 2005

JON W. DUDAS
*Director of the United States Patent and Trademark Office*